United States Patent [19]
Ueno et al.

[11] Patent Number: 5,291,522
[45] Date of Patent: Mar. 1, 1994

[54] DEVICE AND METHOD FOR ESTIMATING SAMPLED VALUE OF IMPULSE RESPONSE AND SIGNAL REPRODUCTION SYSTEM USING THE DEVICE

[75] Inventors: Norio Ueno, Yokohama; Yutaka Awata, Kawasaki, both of Japan

[73] Assignee: Fujitsu Limited, Kawasaki, Japan

[21] Appl. No.: 725,610

[22] Filed: Jul. 3, 1991

[30] Foreign Application Priority Data

Jul. 5, 1990 [JP] Japan .................. 2-179152

[51] Int. Cl.$^5$ ............................... H04L 27/06
[52] U.S. Cl. ......................... 375/94; 375/14; 364/724.2
[58] Field of Search ............ 375/14, 94, 95, 101, 375/106, 99, 90, 96; 364/724.01, 724.19, 724.2

[56] References Cited

U.S. PATENT DOCUMENTS

| | | | |
|---|---|---|---|
| 4,530,104 | 7/1985 | Kamerman | 375/14 |
| 4,564,952 | 1/1986 | Karabinis et al. | 375/101 |
| 4,567,599 | 1/1986 | Mizoguchi | 375/106 |
| 4,599,732 | 7/1986 | LeFever | 375/101 |
| 4,718,073 | 1/1988 | Takaoka | 375/14 |
| 4,800,573 | 1/1989 | Cupo | 375/14 |
| 4,815,103 | 3/1989 | Cupo et al. | 375/106 |

FOREIGN PATENT DOCUMENTS

| | | | |
|---|---|---|---|
| 0039980 | 11/1981 | European Pat. Off. | 375/14 |
| 0173569 | 3/1986 | European Pat. Off. | |
| 0334239 | 9/1989 | European Pat. Off. | |
| 0210032 | 10/1985 | Japan | 375/14 |
| 62-292079 | of 1987 | Japan | |
| 1-185042 | of 1989 | Japan | |
| 1-240038 | of 1989 | Japan | |
| 1-240039 | of 1989 | Japan | |
| 2-9243 | of 1990 | Japan | |
| 2-54643 | of 1990 | Japan | |
| 8101089 | 4/1981 | PCT Int'l Appl. | 375/14 |

OTHER PUBLICATIONS

IEEE International Conference on Communications–ICC/89, Jun. 11-14, 1989, Boston, Mass., US, vol. 1, pp. 233-238.

*Primary Examiner*—Curtis Kuntz
*Assistant Examiner*—Don N. Vo
*Attorney, Agent, or Firm*—Staas & Halsey

[57] ABSTRACT

In a device for estimating a sampled value of an impulse response from input and output signals of a decision circuit which performs a signal decision procedure for reproducing a digital signal, there are provided a first part, operatively coupled to the decision circuit, for generating a first average of absolute values of samples of decided values obtained from the output signal of the decision circuit. A second part is also provided, operatively coupled to the decision circuit, for generating a second average of absolute values of samples of equalized outputs obtained from the input signal of the decision circuit. Also provided is a third part, operatively coupled to the first and second parts for generating a ratio of the first average and the second average, with the ratio being an estimate of the sampled value of the impulse response at a sampling point.

14 Claims, 12 Drawing Sheets

DEVICE AND METHOD FOR ESTIMATING SAMPLED VALUE OF IMPULSE RESPONSE AND SIGNAL REPRODUCTION SYSTEM USING THE DEVICE

BACKGROUND OF THE INVENTION

(1) Field of the Invention

The present invention generally relates to a device and method for estimating a sampled value of an impulse response. Such a device and method are used for a signal reproduction procedure in a digital transmission system. Further, the present invention is concerned with a signal reproduction system using such a device.

(2) Description of the Related Art

Generally, the waveform of a signal distorts and attenuates during digital transmission. Thus, so-called three R functions (Retiming, Reshaping and Regeneration) are needed in the techniques of digital transmission.

FIG. 1 is a block diagram of a conventional signal reproduction circuit used in a digital transmission system. The signal reproduction circuit is composed of a waveform equalizing circuit 101, a timing reproduction circuit 102, and a decision circuit 103. The waveform equalizing circuit 101 equalizes the waveform of a digital signal transmitted via an incoming line (reshaping function). The timing extraction or reproduction circuit 102 reproduces a timing clock (retiming function) from an equalized (reshaped) digital signal output by the waveform equalizing circuit 101. The decision circuit 103 performs a decision procedure on the equalized digital signal by using the reproduced timing clock output by the timing reproduction circuit 102, and outputs a reproduced digital signal to an outgoing line (regeneration function).

The timing reproduction circuit 102 generates the timing reproduction clock as shown in FIG. 2(a) on the basis of an eye in, for example, an equalized AMI (Alternate Mark Inversion) output. The decision circuit 103 detects the mark or space of the equalized AMI output at each rise (decision point) of the reproduced timing clock, and generates a reproduced output (NRZ (Non Return to Zero) output), as shown in FIG. 2(b).

Conventionally, the timing reproduction circuit 102 is comprised of an analog circuit, as shown in FIG. 3. The analog circuit shown in FIG. 3 extracts a signal portion of the AMI waveform around only each peak value thereof by a full-wave rectification circuit 102-1. Then, a full-wave rectified output from the circuit 102-1 as shown in FIG. 4(a) is input, via a resistor R, to an LC tank circuit 102-2, which is made up of an inductor L and a capacitor C. The LC tank circuit 102-2 generates a sine wave corresponding to a desired clock frequency, as shown in FIG. 4(b). The sine wave output by the LC tank circuit 102-2 is shaped by a limiter amplifier 102-3, which generates the aforementioned reproduced timing clock, as shown in FIG. 4(c).

However, there is a disadvantage in that it is necessary to use a large-size coil in order to form the LC tank circuit 102-2. In addition, the configuration shown in FIG. 3 cannot extract the timing signal from the AMI signal or a series of spaces (zeros).

In order to eliminate the above-mentioned disadvantages, a timing reproduction circuit using a digital phase-locked loop (DPLL) has been proposed. A conventional DPLL is shown in FIG. 5. The DPLL shown in FIG. 5 is made up of a phase comparator 201, a frequency divider 202, and a master clock generator 203. The master clock generator 203 generates a master clock having a frequency (20.48 MHz, for example) more than 100 times a necessary clock frequency (80 kHz, for example). The frequency divider 202 divides the frequency of the master clock in order to generate a clock having the necessary clock frequency. The phase of the clock generated by the frequency divider 202 is compared with the phase of an input signal. The frequency dividing ratio in the frequency divider 202 is adjusted based on the phase difference between the signals input to the phase comparator 201.

FIG. 6 shows a signal reproduction circuit which uses a DPLL as described above. The signal reproduction circuit shown in FIG. 6 is composed of a waveform equalizing circuit 1, a timing reproduction circuit 2 and a decision circuit 3. The waveform equalizing circuit 1 is made up of an automatic gain controller (AGC) 11 and a decision feedback type equalizer 12. The AGC 11 receives an input signal in digital form and automatically adjusts the gain of the input signal to a fixed level. The equalizer 12 corrects the output of the AGC 11 on the basis of input and output signals of the decision circuit 3, as will be described in detail later.

The timing reproduction circuit 2 generates a reproduced timing clock from an equalized signal output by the waveform equalizing circuit 1, and is composed of a sampled value estimating formula evaluation unit 21, a controller 22, a frequency divider 23 and a master clock generator 24. The evaluation unit 21 estimates an impulse response waveform of each isolated pulse contained in the input signal, and extracts information about the phase of the estimated impulse response waveform. The nth sampled value of the impulse response, labeled hn, is estimated as follows:

$$f_b = \sum_{k=0} (a_{n-k} \cdot h_k) \quad (1)$$

where fn is the nth value in a train of sampled values of the input signal (equalized outputs), and $a_{n-k}$ is a train of decided values of the input signal. Formula (1) can be modified as follows:

$$a_{n-1} \cdot f_n = a_{n-1} \sum_{k=0} (a_{n-k} \cdot h_k) = a_{n-1} \cdot a_n \cdot h_0 + \quad (2)$$

$$a_{n-1} \cdot a_{n-1} \cdot h_1 + \ldots a_{n-1} \cdot a_0 \cdot h_n;$$

It will be noted that the items after the second item $a_{n-1} \cdot a_{n-1} \cdot h_1$ are values smaller than the second item and positive or negative signs at random. Thus, the summation of the items after the second item converges to zero. As a result, the average value of $a_{n-1} \cdot f_n$, $E[a_{n-1} \cdot f_n]$ is as follows:

$$E[a_{n-1} \cdot f_n] = E[a_{n-1}^2 \cdot h_q] = h_1 \cdot E[a_{n-1}^2] \quad (3).$$

Thus, $h_1$ can be written as follows:

$$h1 = E[a_{n-1} \cdot f_n]/E[a_{n-1}^2] \quad (4)$$

In the above-mentioned way, it is possible to estimate the first sampled value $h_1$ of the train of sampled values of the impulse response at the sampling point.

FIG. 7(a) shows an input pulse, and FIG. 7(b) shows an impulse response thereto. The first sampled value $h_1$ of the impulse response is estimated by the above-mentioned formula (4).

As shown in FIG. 8(a), a threshold value hth is determined. When the sampling point is at a correct position, the first sampled value $h_1$ is equal to the threshold value hth. At this time, the sampling point is positioned at a left shoulder portion of a main response contained in the impulse response. The difference between the first sampled value $h_1$ and the threshold value hth is calculated. When the sampled value $h_1$ is larger than the threshold value hth, as shown in FIG. 8(b), the sampling point is too delayed. On the other hand, when the sampled value $h_1$ is smaller than the threshold value hth, as shown in FIG. 8(c), the sampling point is too advanced.

FIG. 9 is a block diagram of the sampled value estimating formula evaluation unit 21. As shown in FIG. 9, the evaluation unit 21 is composed of multipliers 21-1 and 21-2, switches 21-3 - 21-5, an adder 21-6, a delay element (T) 21-7, registers 21-8 and 21-9, a output sample $f_n$ and the decided value sample an-1. The multiplier 21-2 calculates the square $a_{n-1}^2$ of the decided value sample an-1. The switch 21-3 has two switches 21-3a and 21-3b, which operate in opposite switching modes. The switch 21-3a controls the passage of the output $f_n \cdot a_{n-1}$ from the multiplier 21-1, and the switch 21-3b controls the passage of the output $a_{n-1}^2$ from the multiplier 21-2. The switches 21-4 an 21-5 are used for controlling the inputting of the values calculated by the adder 21-6 to the registers 21-8 and 21-9, respectively, and operates in the opposite switching modes. The switch 21-4 has two switches 21-4a and 21-4b, and the switch 21-5 has two switches 21-5a and 21-5b. The switch 21-3a and the switch 21-4 operate in the same switching mode, and the switch 21-3b and the switch 21-5 operate in the same switching mode.

The adder 21-6 adds the (n−1) th calculated value and the (n−2)th calculated value. The delay element 21-7 delays the output of the adder 21-6 by a predetermined time. The register 21-8 is used for storing $E[a_{n-1} \cdot f_n]$, and the register 21-8 is used for storing $E[a_{n-1}^2]$. The comparator 21-10 compares $E[a_{n-1} \cdot f_n]$ read out from the register 21-8 with $E[a_{n-1}^2]$ read out from the register 21-9. It can be seen from the above that the circuit shown in FIG. 9 uses the threshold value hth equal to 1. The controller 21-11 controls the comparison timing of the comparator 21-11, clears the registers 21-8 and 21-9, and controls the switches 21-3 - 21-5.

During operation, the product fn.an-1 is calculated by the multiplier 21-1, and the square $a_{n-1}^2$ of the decided value an-1 is calculated by the multiplier 21-2. The switches 21-3a, 21-4a and 21-4b are closed first. Thereby, an updating value for calculating the average of fn·an−1 is stored in the register 21-8. Next, the switches 21-3b, 21-5a and 21-5b are closed. Thereby, an updating value for calculating the average of $a_{n-1}^2$ is stored in the register 21-9. After that, $E[a_{n-1} \cdot f_n]$ and $E[a_{n-1}^2]$ respectively read out from the registers 21-8 and 21-9 are compared with each other by the comparator 21-10 in response to a control signal output by the controller 21-11. Then, the comparator 21-10 outputs information indicating which $E[a_{n-1} \cdot f_n]$ or $E[a_{n-1}^2]$ is greater (or smaller) than the other. When the comparator 21-10 executes the above-mentioned comparing operation, the contents of the registers 21-8 and 21-9 are cleared.

Returning now to FIG. 6, the evaluation unit 21 generates a control signal for adjusting the frequency dividing ratio in the frequency divider 23 on the basis of the comparison results output by the evaluation unit 21. The frequency divider 23 divides the frequency of a master clock generated by the master clock generator 24. The frequency dividing ratio is controlled by the control signal output by the controller 22. The clock signal output by the frequency divider 23 is input, as the reproduced timing clock, to the decision circuit 3, and is also input to the AGC 11, the equalizing circuit 12 and the evaluation unit 21.

The decision circuit 3 shown in FIG. 6 carries out the decision procedure on the equalized signal output by the waveform equalizing circuit 1 by using the timing reproduction signal output by the timing reproduction circuit 2, so that the reproduced digital signal can be generated. The timing reproduction circuit 2 estimates the impulse response waveform from the equalized output, and compares the estimated sampled value h1 with the threshold value hth in order to adjust the frequency dividing ratio. The frequency divider 23 outputs the reproduced timing clock to the decision circuit 3 in accordance with the adjusted frequency dividing ratio. The decision circuit 3 detects the mark or space of each equalized impulse response at a decision point (sampling point) which is at each rise of the reproduced timing clock, so that the reproduced output is generated by the decision circuit 3.

However, a conventional system as described above has a disadvantage in that it is necessary to calculate the products $a_{n-1}^2$ and an-$1^2$ in order to estimate the sampled value of each impulse response. Nowdays, the reproduction/repeater function can be implemented one one-chip VLSI. However, the multiplier needs an extremely large scale integrated circuit having, for example, thousands of gates, each having a 16 bit × 16 bit scale.

SUMMARY OF THE INVENTION

It is a general object of the present invention to provide a device and method for estimating a sampled value of an impulse response in which the above-mentioned disadvantages are eliminated.

A more specific object of the present invention is to provide a device capable of estimating the sampled value of an impulse response without using a multiplier.

The above-mentioned objects of the present invention are achieved by a device for estimating a sampled value of an impulse response from input and output signals of a decision circuit which performs a signal decision procedure for reproducing a digital signal, with input signal having an equalized waveform. The device comprises: first means, operatively coupled to the decision circuit, for generating a first average of absolute values of decided values obtained from the output signal of the decision circuit and second means, operatively coupled to the decision circuit, for generating a second average of absolute values of equalized outputs obtained from the input signal of the decision circuit. The device also comprises third means, operatively coupled to the first and second means, for generating a ratio of the first average with and the second average, the ratio being an estimate of the sampled value of the impulse response at a sampling point.

The aforementioned objects of the present invention are also achieved by a device for estimating a sampled value of an impulse response from input and output signals of a decision circuit which performs a signal decision procedure for reproducing a digital signal with the input signal having an equalized waveform. The device comprises: first means, operatively coupled to the decision circuit, for generating a first sum of absolute values of j (j is a natural number) samples of decided values obtained from the output signal of the decision circuit and second means, operatively coupled to the decision circuit, for generating a second sum of absolute values of j samples of equalized outputs obtained from the input signal of the decision circuit. The system also comprises third means, operatively coupled to the first and second means, for generating a ratio of the first sum and the second sum, with the ratio being an estimate of the sampled value of the impulse response at a sampling point. There are also provided methods for estimating a sampled value of an impulse response.

Another object of the present invention is to provide a signal reproduction system using the aforementioned device.

This object of the present invention is achieved by a signal reproduction system comprising: waveform equalizing means for equalizing a digital input signal transmitted via a transmission line and for generating an equalized input signal and decision means, operatively coupled to the waveform equalizing means, for performing a decision procedure for the equalized input signal at a predetermined timing and for generating a reproduced digital signal. The system also comprises timing reproduction means, operatively coupled to the waveform equalizing means and the decision means, for generating a clock signal from the equalized input signal and the reproduced digital signal with the clock signal defining the predetermined timing of the decision means. The timing reproduction means comprises first means, operatively coupled to the decision means, for generating a first average of absolute values of samples of decided values obtained from the reproduced digital signal output by the decision means. The timing reproduction means also comprises second means, operatively coupled to the decision means, for generating a second average of absolute values of samples of equalized outputs obtained from the equalized input signal input to the decision means and third means, operatively coupled to the first and second means, for generating a ratio of the first average with and the second average, the ratio being estimated as the sampled value of an impulse response at a sampling point. The timing reproduction means further comprises control means, operatively coupled to the third means, for comparing the sampled value output by the third means with a threshold value and for adjusting the timing of the clock signal on the basis of a result of the comparison. Instead of the above control means, it is possible to use a control means for comparing the sampled value output by the third means with a threshold value and for adjusting a gain of the waveform equalizing means for equalizing the waveform of the digital input signal on the basis of a result of comparison.

The above-mentioned object is also achieved by a signal reproduction system which has a timing reproduction means comprising first means, operatively coupled to the decision circuit, for generating a first sum of absolute values of j (j is a natural number) samples of decided values obtained from the reproduced digital signal of the decision means. The reproduction means also comprises second means, operatively coupled to the decision circuit, for generating a second sum of absolute values of j samples of equalized outputs obtained from the equalized input signal of the decision means and third means, operatively coupled to the first and second means, for generating a ratio of the first sum and the second sum, with the ratio being estimated as the sampled value of an impulse response at a sampling point. The reproduction means further comprises control means, operatively coupled to the third means, for comparing the sampled value output by the third means with a threshold value and for adjusting the timing of the clock signal on the basis of a result of comparison. Instead of the above control means, it is possible to use a control means for comparing the sampled value output by the third means with a threshold value and for adjusting a gain of the waveform equalizing means for equalizing the waveform of the digital input signal on the basis of a result of comparison.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 10A:
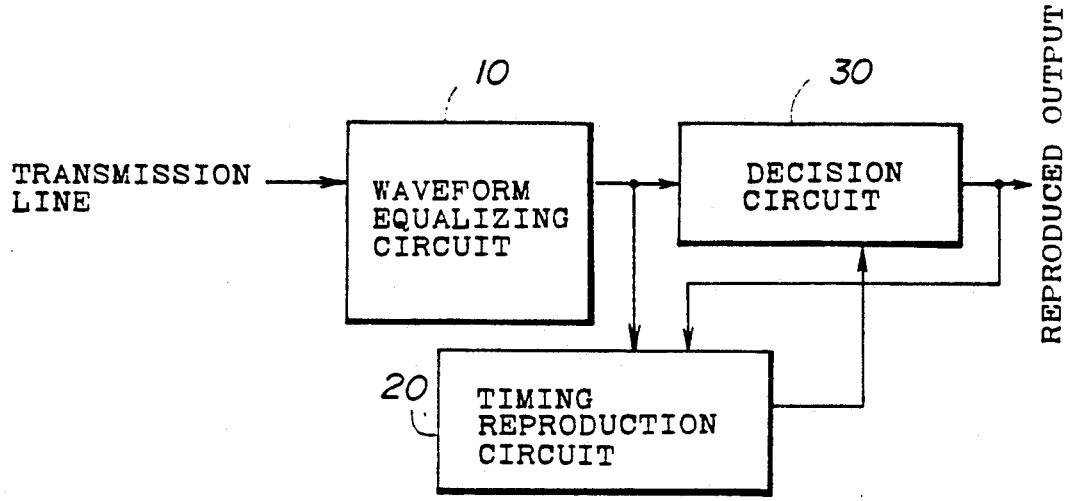
FIG. 10A is a block diagram showing an overview of a first preferred embodiment of the present invention.

FIG. 10A shows an overview of a signal reproduction device according to a first preferred embodiment of the present invention. The signal reproduction device shown in FIG. 10A is composed of a waveform equalizing circuit 10, a timing reproduction circuit 20 and a decision circuit 30. The waveform equalizing circuit 10 receives a digital input signal transmitted via a transmission line, and equalizes the waveform of the received digital input signal. The timing reproduction circuit 20 reproduces a timing clock from an equalized output signal from the waveform equalizing circuit 10 and a reproduced digital output signal from the decision circuit 30. During the timing reproduction procedure, either a first sampled value estimating procedure or a second sampled value estimating procedure is used.

The first sampled value estimating procedure calculates the ratio of the average of the absolute values of decided values obtained from the output signal of the decision circuit 30 and the average of the absolute values of equalized outputs (sampled values) obtained from the input signal of the decision circuit 30. The ratio thus calculated is estimated as the sampled value of the impulse response at the sampling point. The second sampled value estimating procedure calculates the ratio of the sum of the absolute values of j samples (j is a natural number) of decided values obtained from the output signal of the decision circuit 30 and the sum of the absolute values of j samples of equalized outputs (sampled values) obtained from the input signal of the decision circuit 30. The ratio thus calculated is an estimate of the sampled value of the impulse response at the sampling point.

The timing reproduction circuit 20 compares the sampled value of the impulse response with a predetermined threshold value, and controls the timing for the decision procedure executed by the decision circuit 30. When the sampled value of the impulse response is greater than the threshold value, the sampling point is too advanced. On the other hand, when the sampled value of the impulse response is smaller than the threshold value, the sampling point is too delayed. The decision circuit 30 carries out the decision procedure for the equalized output in accordance with the timings indicated by the timing reproduction circuit 20.

Figure 10B:
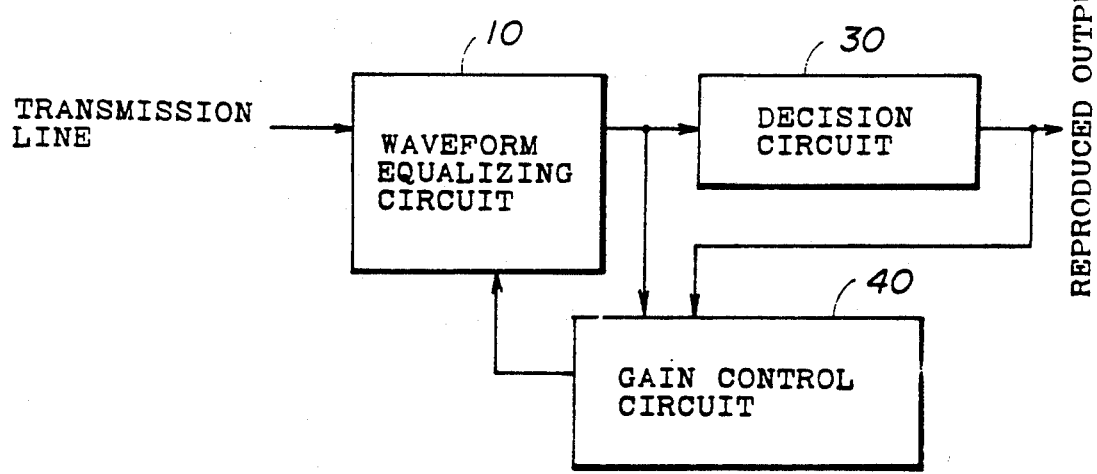
FIG. 10B is a block diagram showing an overview of a second preferred embodiment of the present invention.

FIG. 10B is a block diagram of an overview of a signal reproduction device according to a second preferred embodiment of the present invention. In FIG. 10B, those parts which are the same as those shown in FIG. 10A are given the same reference numerals. A gain controller 40 shown in FIG. 10B is substituted for the timing reproduction circuit 20 shown in FIG. 10A. The gain controller 40 controls the gain of the waveform equalizing circuit 10. More specifically, the gain controller 40 compares the sampled value calculated by either the aforementioned first or second sampled value estimating procedures with the threshold value, and controls the gain of the waveform equalizing circuit 10 on the basis of the comparison results. When the sampled value of the impulse response is greater than the threshold value, the gain controller 40 decreases the gain of the waveform equalizing circuit 10. On the other hand, when the sample value of the impulse response is smaller than the threshold value, the gain controller 40 increases the gain of the waveform equalizing circuit 10.

Figure 1:
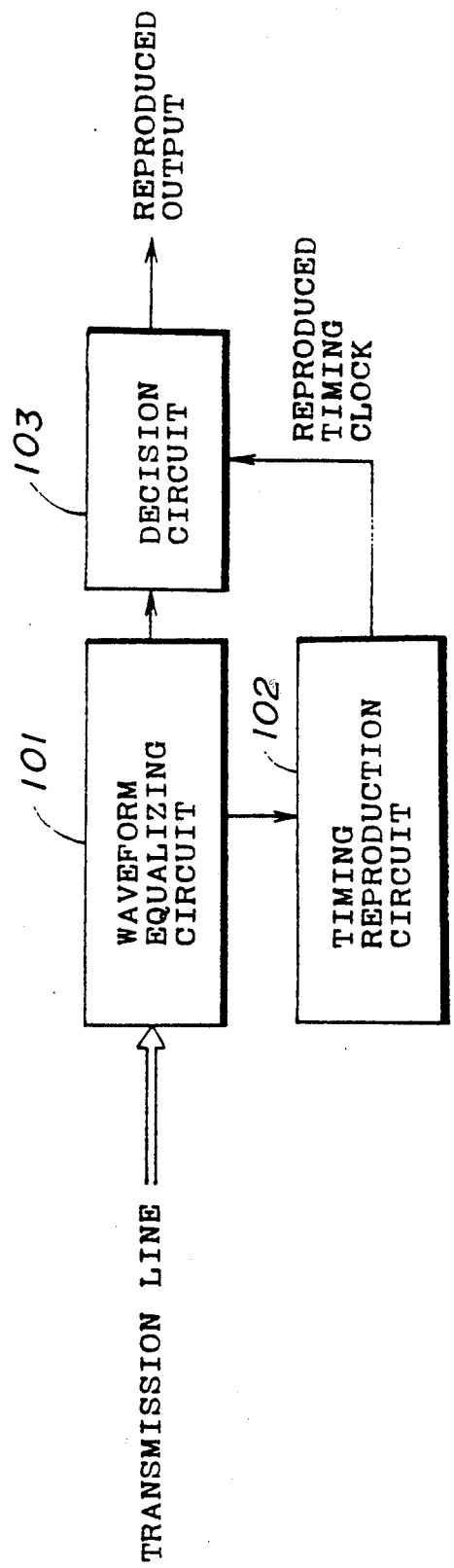
FIG. 1 is a block diagram of a signal reproduction circuit used in a conventional transmission system.
Figure 2:
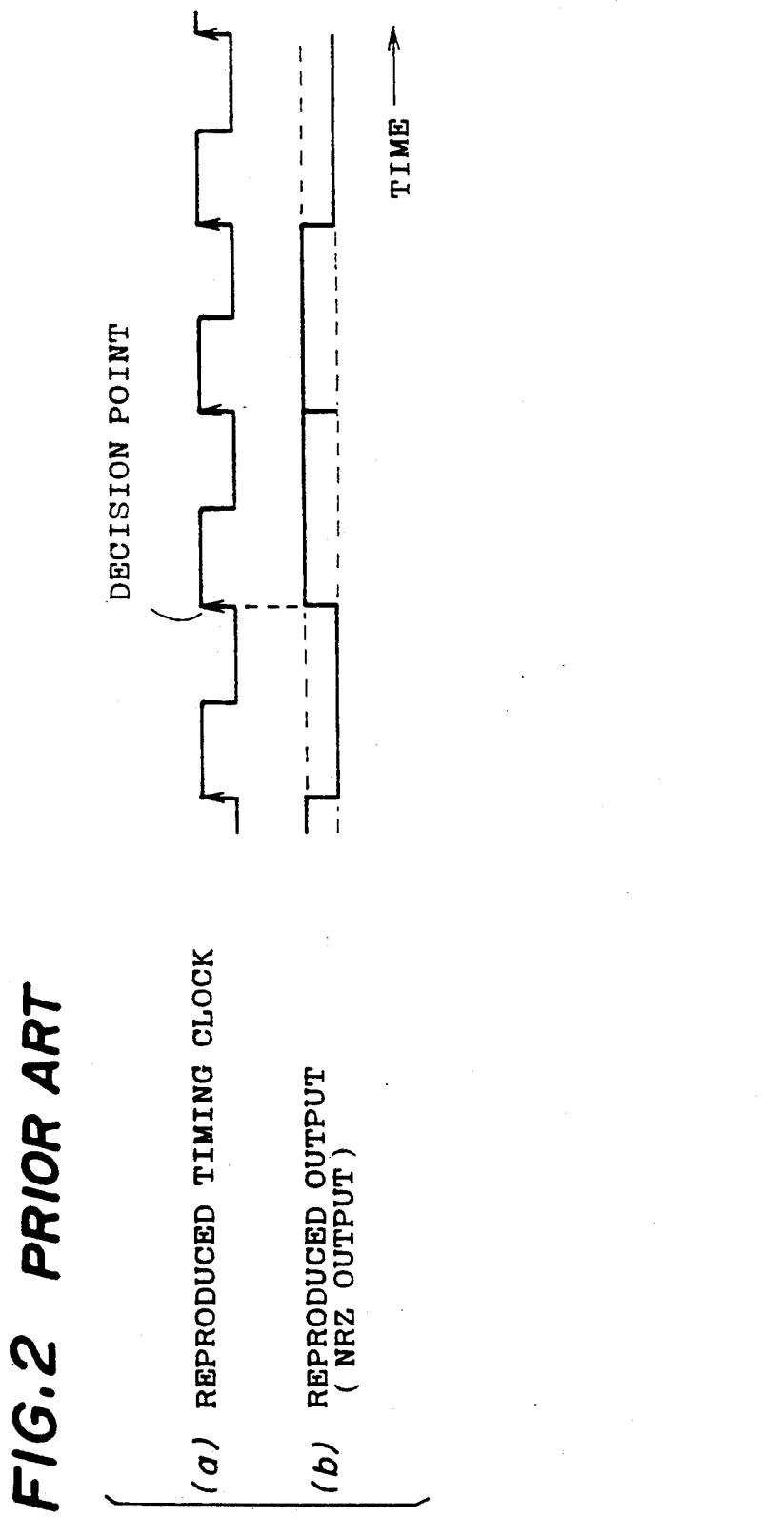
FIG. 2 is a waveform diagram illustrating the operation of the signal reproduction circuit shown in FIG. 1.
Figure 3:
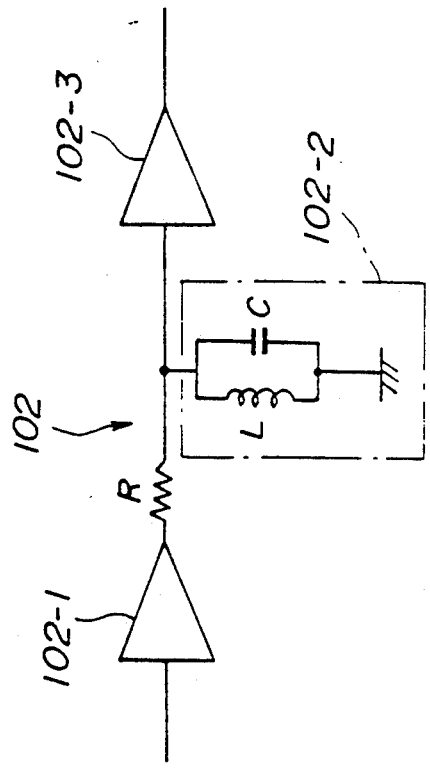
FIG. 3 is a circuit diagram of a conventional analog type timing reproduction circuit.
Figure 5:
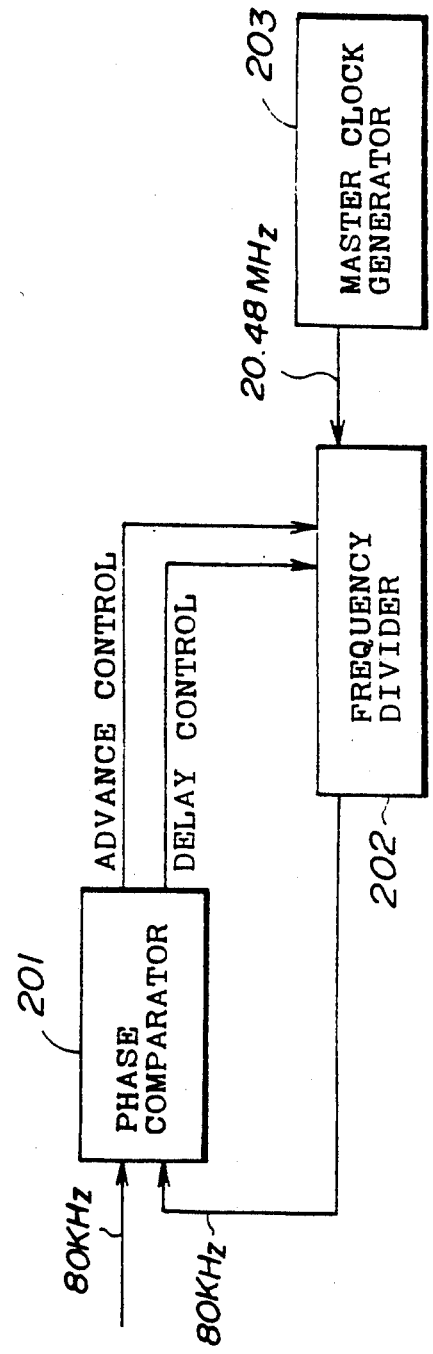
FIG. 5 is a block diagram of a conventional digital phase-locked loop.
Figure 4:
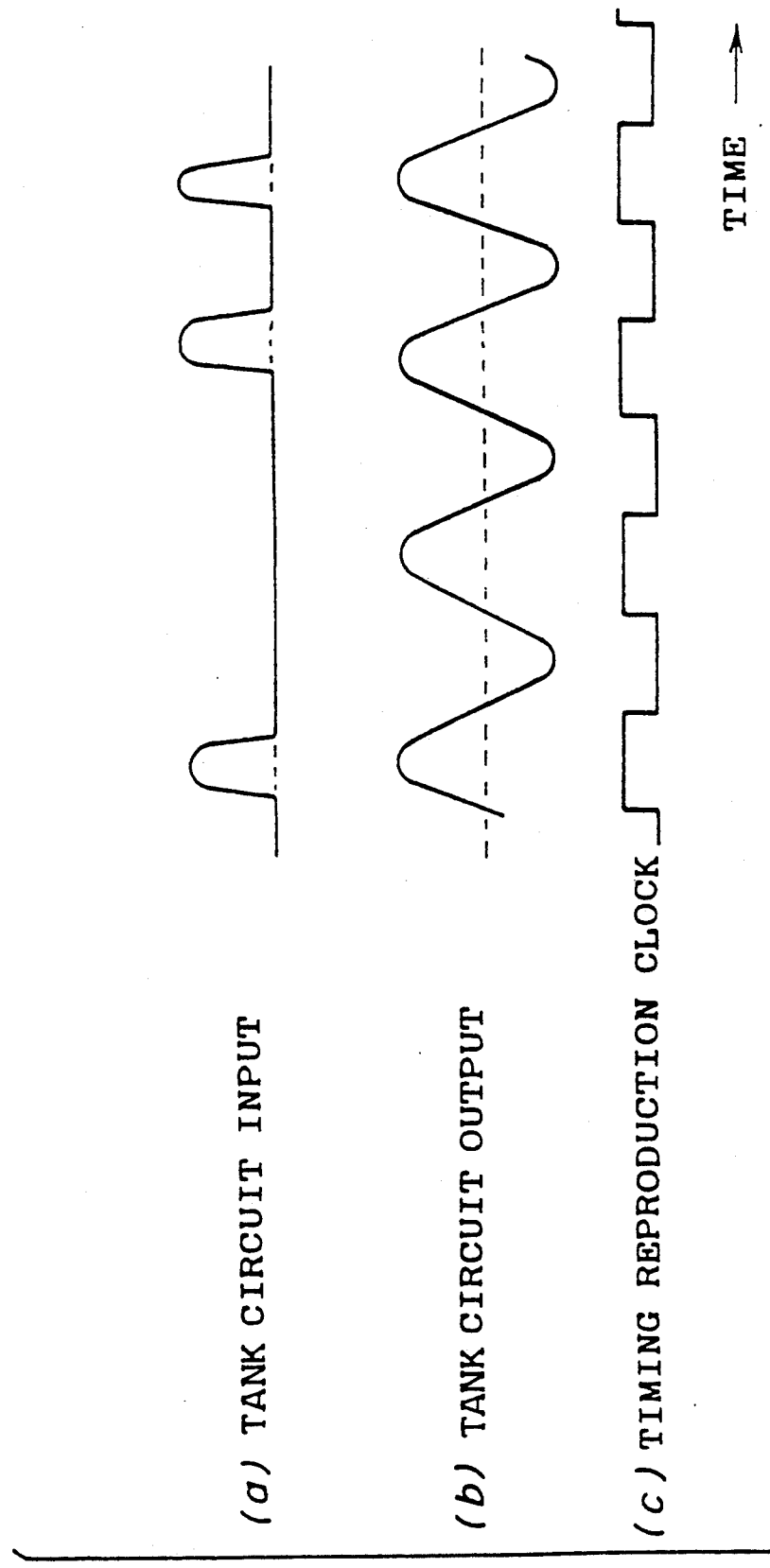
FIG. 4 is a waveform diagram illustrating the operation of the timing reproduction circuit shown in FIG. 3.
Figure 6:
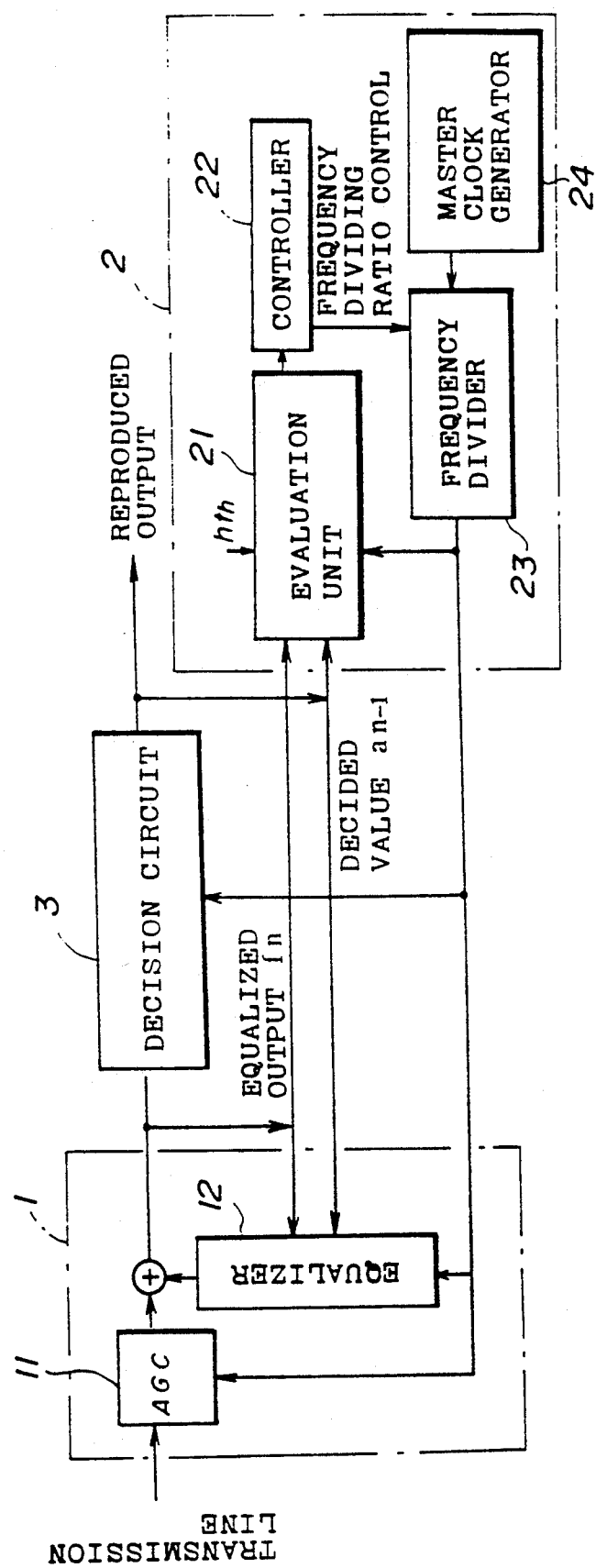
FIG. 6 is a block diagram of a conventional timing reproduction circuit using the digital phase-locked loop shown in FIG. 5.
Figure 7:
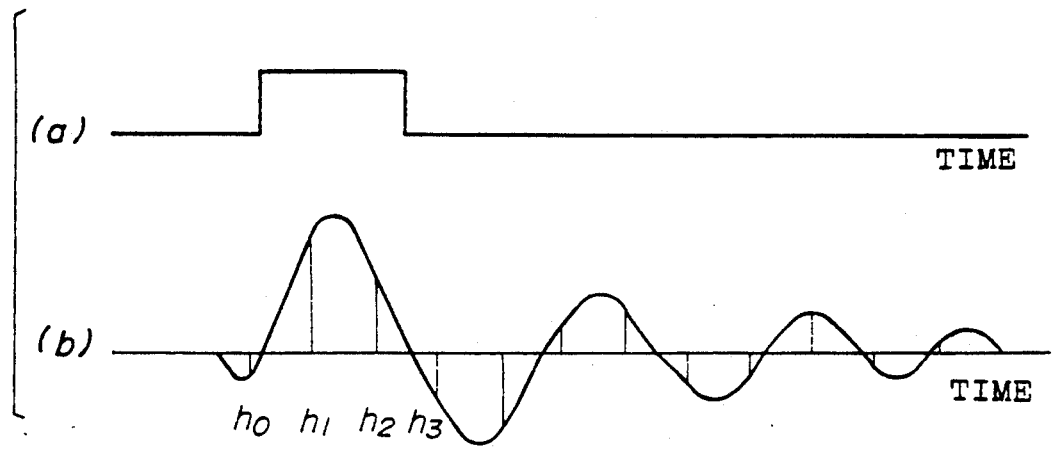
FIG. 7 is a waveform diagram showing a pulse and its impulse response.

A description will now be given of the first preferred embodiment with reference to FIG. 11, in which those parts which are the same as those shown in FIG. 6 are given the same reference numerals. The timing reproduction circuit 20 is substituted for the timing reproduction circuit 2 shown in FIG. 6. The timing reproduction circuit 20 includes a sampled value estimating formula evaluation unit 210, which is substituted for the sampled value estimating formula evaluation unit 21 shown in FIG. 6.

An evaluation unit 210 estimates an impulse response waveform of each isolated (individual) pulse contained in the input signal, and extracts information about the phase thereof. The evaluation unit 210 estimates the impulse response hn in the following way. First, the equalized output sample (sampled value) fn is calculated as follows:

$$f_n = \sum_{k=0}^{} (a_{n-k} \cdot h_k) \sum_{k=0}^{} |f_n| = \quad (5)$$

$$\sum_{n=1}^{} \left| \sum_{k=0}^{} (a_{n-k} \cdot h_k) \right| = |a_i \cdot h_0 + a_0 \cdot h_1 + \ldots| + |a_2 \cdot h_0 + a_i h_i + a_0 \cdot h_2 + \ldots| + |a_3 \cdot h_0 + a_2 \cdot_1 + a_1 \cdot h_2 + \ldots| + \ldots$$

The sign of each absolute value term in formula (5) is mainly determined at a sampling point near the peak value of the impulse response. Particularly, when the decision feedback starts to work, the sign in each absolute value term is definitely determined at the sampling point near the peak value of the impulse response. For example, if the second term of the formula (5) is close to the peak value, following formula (6) is obtained:

$$\sum_{n=1}^{} |f_n| = |a_o \cdot h_1| + a_1 + |a_1 \cdot h_1| + a_2 + \ldots = \quad (6)$$

$$\sum_{n=1}^{} |a_{n-1} \cdot h_1| + \sum_{n=1}^{j} a_n$$

where:

$$\sum_{n=1}^{} a_n = (\pm)(a_1 \cdot h_0 + a_{-1} \cdot h_2 + \ldots)(\pm) \quad (7)$$

$$(a_2 \cdot h_0 + a_0 h_2 + \ldots)(\pm)(a_3 \cdot h_0 + a_1 \cdot h_2 + \ldots)(\pm)\ldots;$$

where $(\pm)$ means that the sign is determined at random. It can be seen from the above that each sub-series in the summation of $a_n$ has the sign changing at random, and the sampling points $h_0, h_2, h_3 \ldots$ are smaller than the sampling point $h_1$. Thus $\Sigma a_n \approx 0$, so that the formula (6) can be written as follows;

$$\sum_{n=1}^{} |f_n| = \sum_{n=1}^{} |a_{n-1}| \cdot h_1 = h_1 \cdot \sum_{n=1}^{} |a_{n-1}| \quad (8)$$

That is, the following is obtained:

$$h_i = \sum_{n=1}^{} |f_n| / \sum_{n=1}^{} |a_{n-1}| = E[|f_n|]/E[|a_{n-1}|] = \quad (9)$$

$$\sum_{n=1}^{j} |f_n| / \sum_{n=1}^{j} |a_{n-1}|$$

As a result, it is possible to estimate the first sampled value h1 of the impulse response by the ratio of the sum of the absolute values of fn and the sum of the absolute values of an−1. It will be noted that E denotes the average, and j is a natural number, such as 64 or 128.

In the above-mentioned way, the sampled value of the impulse response at the sampling point is defined by the ratio of the average value $E[a_{n-1}|]$ of the absolute values of the decided value samples an−1 obtained from the output signal of the decision circuit 30 and the average value $E[|f_n|]$ of the absolute values of the equalized output samples fn obtained from the input signal of the decision circuit 30, or the ratio of the sum $$\sum_{n=1}^{j} |a_{n-1}|$$

of the absolute values of j decided value samples an−1 obtained from the output signal of the decision circuit 30 (hereafter, the sum $$\sum_{n=1}^{j} |a_{n-1}|$$

is referred to as $\Sigma|a_{n-1}|_j$ and the sum $\Sigma|f_n|$ of the absolute values of j equalized output samples fn obtained from the input signal of the decision circuit 30 (hereafter, the sum is referred to as $\Sigma|f_n|_i$.

Figure 8:
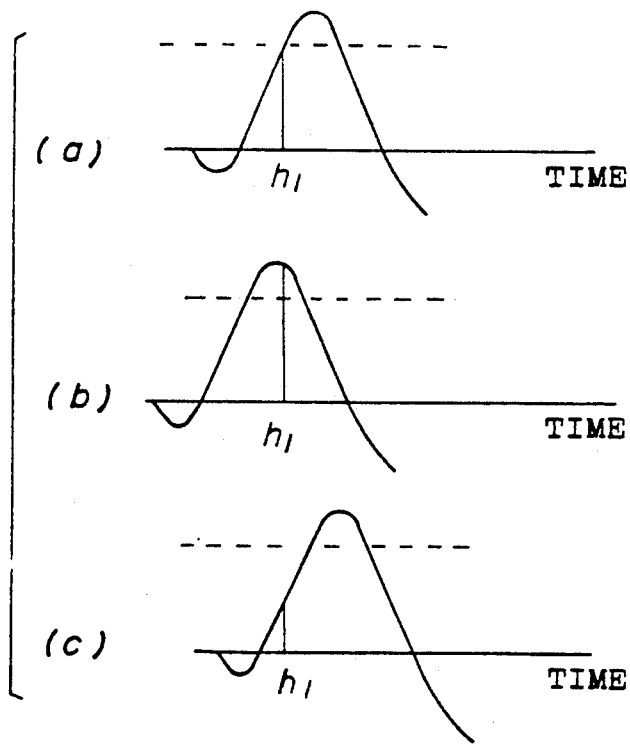
FIG. 8 is a waveform diagram showing a problem occurring during a sampled value estimating procedure.

Then, the sampled value calculated in the above-mentioned way is compared with the threshold value hth. When the sampled value h1 is smaller than the threshold value hth, the sampled point is delayed. On the other hand, when the sampled value h1 is larger than the threshold value hth, the sampled point is advanced. In this way, it is possible to always position the sampling point as shown in FIG. 8(a).

Figure 9:
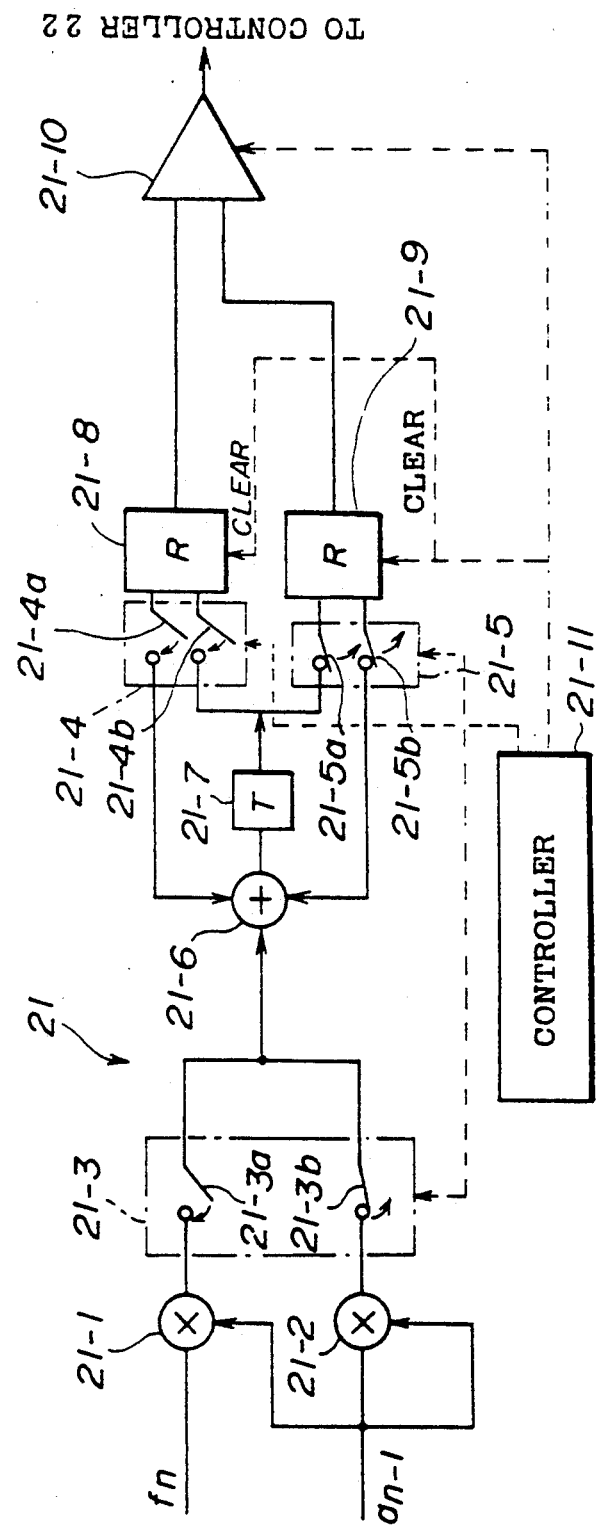
FIG. 9 is a block diagram of a conventional sampled value estimating formula evaluation unit shown in FIG. 6.
Figure 12:
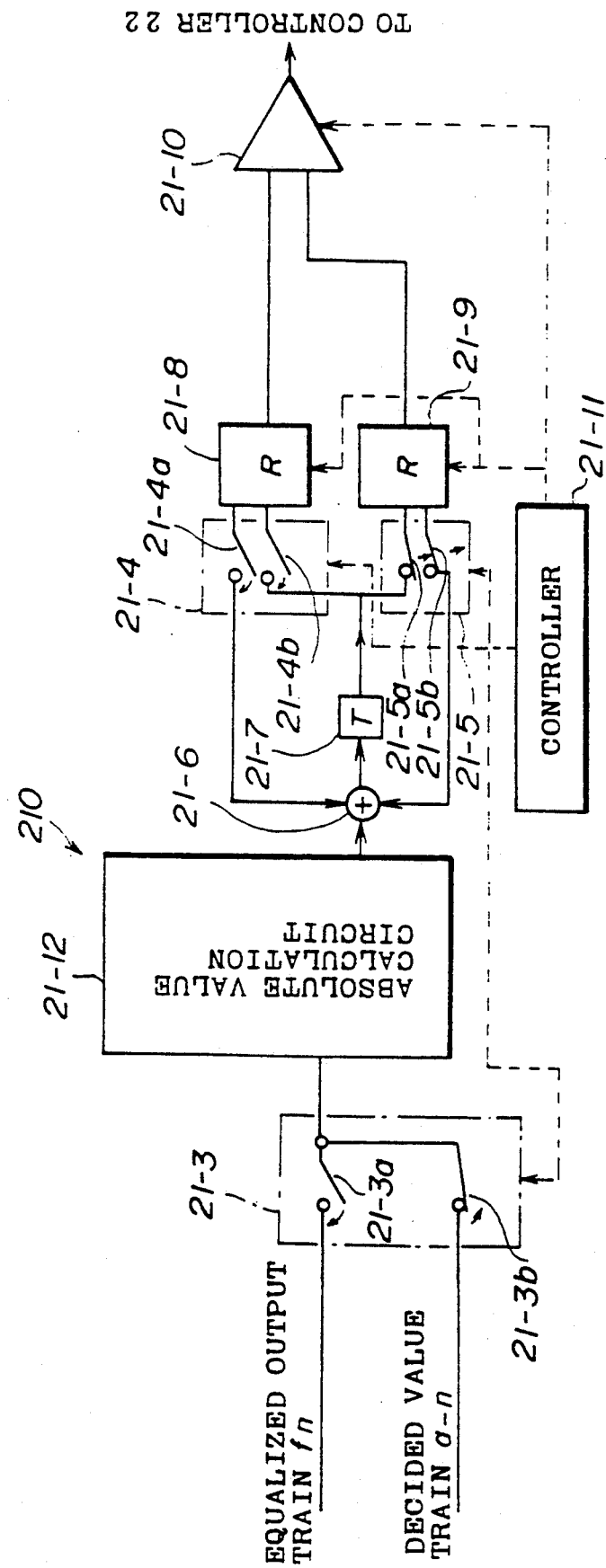
FIG. 12 is a block diagram of a sampled value estimating formula evaluation unit shown in FIG. 11.

FIG. 12 is a block diagram of the sampled value estimating formula evaluation unit 210. In FIG. 12, those parts which are the same as those shown in FIG. 9 are given the same reference numerals. The evaluation unit 210 has an absolute value calculation circuit 21-12 in addition to the aforementioned switches 21-3–21-5, the adder 21-6, the delay element 21-7, the registers 21-8 and 21-9, the comparator 21-10 and the controller 21-11. It should be noted that the evaluation unit 210 shown in FIG. 12 does not have the multipliers 21-1 and 21-2 shown in FIG. 9, but instead has the absolute value calculation circuit 21-12. The structural elements other than the absolute value calculation circuit 21-12 have been described.

Figure 13:
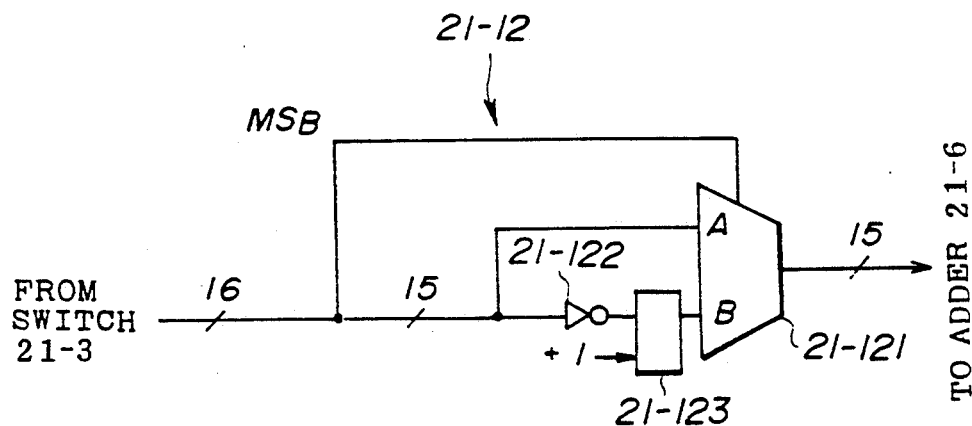
FIG. 13 is a block diagram of an absolute value calculation unit shown in FIG. 12.

FIG. 13 is a block diagram of the absolute value calculation circuit 21-12, which is made up of a selector 21-121, a NOT gate 21-122 and an adder 21-123. Assuming that 16-bit input data is input to the absolute value calculation circuit 21-12, the most significant bit (MSB) is a bit indicating the sign of the input data in which the positive sign is indicated by 0 and the negative sign is indicated by 1. The MSB serves as a switch signal for controlling the selector 21-121. When the input data is positive (MSB=0), the selector 21-121 selects input A, so that the input data passes through the selector 21-121. On the other hand, when the input data is negative (MSB=1), the selector 21-121 selects input B. The input data is inverted by the NOT gate 21-122, and +1 is added to an inverted version of the input data by the adder 21-123. The combination of the NOT gate 21-122 and the adder 21-123 generates the absolute value of a binary signal which is one bit of the input data. It should be noted that a plurality of combinations of the NOT gate 21-122 and the selector 21-123 are provided for the respective bits of the input data. However, only one combination is illustrated in FIG. 13 for the sake of simplicity.

Returning now to FIG. 12, the register 21-8 functions to store the average value E|fn| of the absolute values of the equalized output samples or the sum $\Sigma|f_n|_j$ of the absolute values of j equalized output samples. The register 21-9 functions to store the average value $\Sigma|f_n|$ of the absolute values of the decided value samples or the sum $\Sigma|a_{n-1}|_j$ of the absolute values of j decided value samples. The comparator 21-10 compares the output E|fn| (or $\Sigma|f_n|_j$) of the register 21-8 with the output E|a_{n-1}| (or $\Sigma|a_{n-1}|_j$) of the register 21-9. It will be noted that the threshold value hth is set to 1 in the evaluation unit 210. The controller 21-11 controls the operating timing of the comparator 21-11, clears the registers 21-8 and 21-9, and controls the switches 21-3–21-5.

During operation, the switches 21-3a 21-4a and 21-4b are respectively closed. The absolute value calculation circuit 21-12 calculates the absolute value of the sampled value fn of the equalized input signal. Then, an updating value for calculating E|fn| or $\Sigma|f_n|_j$ is generated due to the function of the adder 21-6, and the added result is written into the register 21-8. After that, the switches 21-3b, 21-5a and 21-5b are closed. The absolute value calculation circuit 21-12 calculates the absolute value of the decided value $a_{n-1}$. Then, an updating value for calculating E|an−1| or $\Sigma|a_{n-1}|_j$ is generated due to the function of the adder 21-6, and the added result is written into the register 21-9. After that, in response to the control signal output by the controller 21-11, the output E|fn| (or $\Sigma|f_n|_j$ of the register 21-8 is compared with the output E|a_{n-1}| (or $\Sigma|a_{n-1}|_j$ of the register 21-9, and information indicating which one is greater than the other is output. At the same time as the comparator 21-10 executes the comparing operation, the contents of the registers 21-8 and 21-9 are cleared.

As has been described above, the first embodiment of the present invention does not need any multiplier. Thus, it is possible to provide a compact evaluation unit, which can easily be comprised of hardware. This means that it is not necessary to use a large-scale circuit, such as a digital signal processor. It will be noted that the threshold value hth is not limited to 1, but can be set to a desired value.

A description will now be given of a second preferred embodiment of the present invention, which employs a timing extraction procedure based on a precursory method. In the precursory method, a rise of the impulse response from zero is detected and always regulated at zero. In the second embodiment, the aforementioned first or second sampled value estimating procedure is applied to an estimation of an equalized level of the signal via the transmission line.

Figure 14:
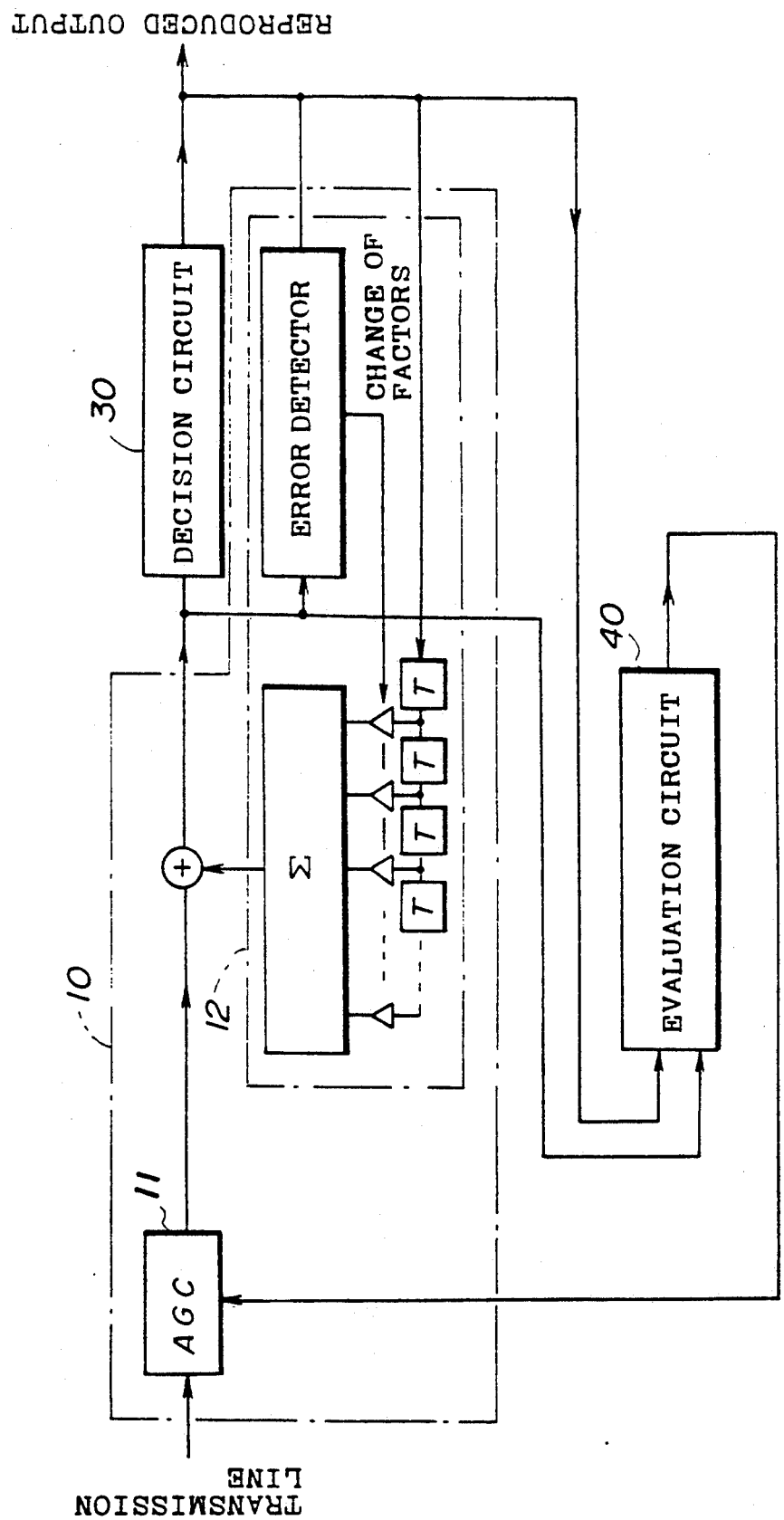
FIG. 14 is a block diagram of the second embodiment of the present invention shown in FIG. 10B in more detail.

FIG. 14 is a block diagram of the second embodiment of the present invention, which is composed of the waveform equalizing circuit 10, the decision circuit 30 and the gain control circuit 40. The waveform equalizing circuit 10 is composed of the AGC 11 and the decision feedback type equalizer 12. The AGC 11 automatically controls the gain of the amplified signal so that it is always fixed to a predetermined level. The equalizer 12 corrects the output from the AGC 11 on the basis of the input and output signals of the decision circuit 30. The AGC 11 is controlled by a control signal generated and output by the gain control circuit 40, which is comprised of an evaluation unit as has been described previously. Hereafter, the gain control circuit 40 is referred to as the evaluation circuit 40. The equalizer 12 is comprised of delay elements T, an error detector, weighting factor multipliers and a summation device, all of which are connected in a conventional way.

Figure 11:
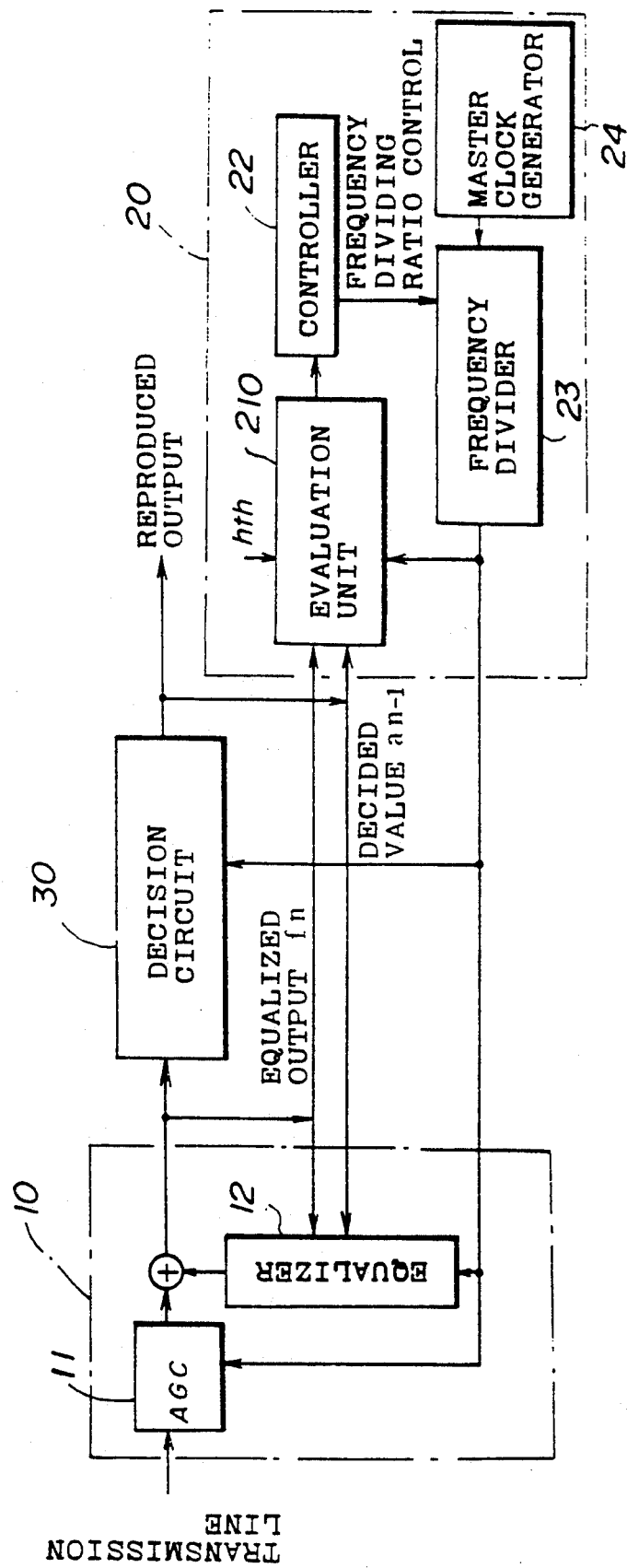
FIG. 11 is a block diagram of the first embodiment of the present invention shown in FIG. 10A in more detail.
Figure 15:
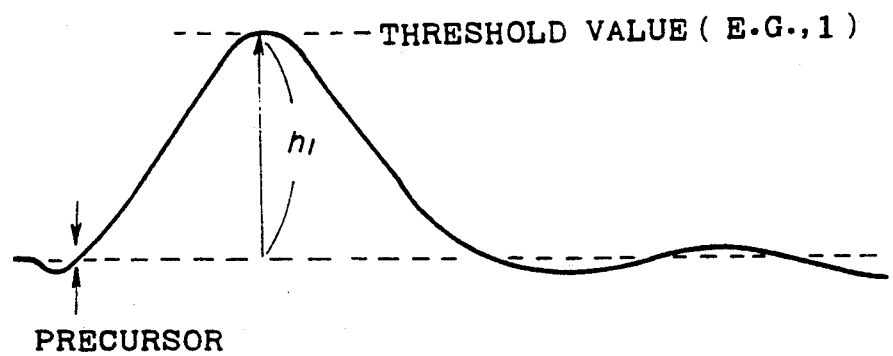
FIG. 15 is a waveform diagram showing the operation of a gain control circuit (evaluation unit) shown in FIG. 14.

The evaluation unit 40 operates in the same way as the evaluation unit 210 shown in FIG. 11. That is, the evaluation unit 40 calculates the ratio of the average value $E[|a_{n-1}|]$ of the absolute values of the decided value samples an-1 obtained from the output signal of the decision circuit 30 and the average value $E[|f_n|]$ of the absolute values of the equalized output samples fn obtained from the input of the decision circuit 30, or the ratio of the sum $\Sigma |a_{n-1}|_j$ of the absolute values of j decided value trains obtained from the output signal of the decision circuit 30 and the sum $\Sigma |f_n|_j$ of the absolute values of j equalized output trains obtained from the input of the decision circuit 30. The ratio thus calculated is an estimate of the sampled value $h_1$ of the impulse response at the sampling point. When the sampled value $h_1$ of the impulse response is greater than the threshold value hth, the evaluation circuit 40 generates the control signal directed to reducing the gain of the AGC 11. On the other hand, when the sampled value h1 of the impulse response is smaller than the threshold value hth, the evaluation unit 40 generates the control signal directed to increasing the gain of the AGC 11. It should be noted that since the second embodiment operates in the precursory method, the sampled value $h_1$ is positioned at the peak of the equalized output signal, as shown in FIG. 15. The threshold value hth is set equal to, for example 1.

The second embodiment of the present invention has the same advantages as those of the first embodiment thereof. It should be noted that the second embodiment does not require any multiplier.

The present invention is not limited to the specifically disclosed embodiments, and variations and modifications may be made without departing from the scope of the present invention.

What is claimed is;

1. A device for estimating a sampled value of an impulse response from a input signal and an output signal of a decision circuit which performs a signal decision procedure for reproducing a digital signal, the input signal having an equalized waveform, said device comprising:
   first means, operatively coupled to the decision circuit, for generating first absolute values of samples of decided values obtained from the output signal of the decision circuit;
   second means, operatively coupled to the decision circuit, for generating second absolute values of samples of equalized outputs obtained from the input signal of the decision circuit; and
   third means, operatively coupled to said first and second means, for generating a dividing ratio using said first absolute values and said second absolute values, and said ratio being an estimate of the sampled value of the impulse response at a sampling point shifted by a predetermined amount.

2. A device as claimed in claim 1, wherein said first and second means comprise:
   switch means, provided in common to said first and second means, for selectively supplying either one of the samples of the decided values or one of the samples of the equalized outputs; and
   absolute value calculating means, provided in common to said first and second means, for calculating an absolute value of a selected train output from said switch means.

3. A device as claimed in claim 1, wherein said first and second means comprises:
   switch means, provided in common to said first and second means, for selectively supplying either one of the samples of the decided values or one of the samples of the equalized outputs; and
   absolute value calculating means, provided in common to said first and second means, for calculating an absolute value of a selected sample output from said switch means.

4. A device for estimating a sampled value of an impulse response from an input signal and an output signal of a decision circuit which performs a signal decision procedure for reproducing a digital signal, the input signal having an equalized waveform, said device comprising:
   first means, operatively coupled to the decision circuit, for generating a first sum of absolute values of j (where j is a natural number) samples of decided values obtained from the output signal of the decision circuit;
   second means, operatively coupled to the decision circuit, for generating a second sum of absolute values of j samples of equalized outputs obtained from the input signal of the decision circuit; and
   third means, operatively coupled to said first and second means, for generating a dividing ratio using said first sum and said second sum, and said ratio being an estimate of the sampled value of the impulse response at a sampling point shifted by a predetermined amount.

5. A method for estimating a sampled value of an impulse response from an input signal and an output signal of a decision circuit which performs a signal decision procedure for reproducing a digital signal, said input signal having an equalized waveform, said method comprising the steps of:
   generating first absolute values of samples of decided values obtained from the output signal of the decision circuit;
   generating second absolute values of samples of equalized outputs obtained from the input signal of the decision circuit; and
   generating a dividing ratio using said first absolute values and said second absolute values, and said dividing ratio being an estimate of the sampled value of the impulse response at a sampling point shifted by a predetermined amount.

6. A method for estimating a sampled value of an impulse response from an input signal and an output signal of a decision circuit which performs a signal decision procedure for reproducing a digital signal, said input signal having an equalized waveform, said method comprising the steps of:
   generating a first sum of absolute values of j (where j is a natural number) samples of decided values obtained from the output signal of the decision circuit;
   generating a second sum of absolute values of j samples of equalized outputs obtained from the input signal of the decision circuit; and
   generating a ratio of said first sum and said second sum, and said ratio being an estimate of the sampled value of the impulse response at a sampling point.

7. A signal reproduction system coupled to a transmission line, said system comprising:
   waveform equalizing means for equalizing a digital input signal transmitted via the transmission line and for generating an equalized input signal;
   decision means, operatively coupled to said waveform equalizing means, for performing a decision procedure for the equalized input signal at a timing and for generating a reproduced digital signal; and
   timing reproduction means, operatively coupled to said waveform equalizing means and said decision means, for generating a clock signal from said equalized input signal and said reproduced digital signal, said clock signal defining said timing of said decision means, and said timing reproduction means comprising:

first means, operatively coupled to said decision means, for generating first absolute values of samples of decided values obtained from the reproduced digital signal output by the decision means;

second means, operatively coupled to said decision means, for generating second absolute values of samples of equalized outputs obtained from the equalized input signal input to said decision means;

third means, operatively coupled to said first and second means, for generating a dividing ratio using said first absolute values and said second absolute values, said ratio being an estimate of a sampled value of an impulse response at a sampling point shifted by a predetermined amount; and control means, operatively coupled to said third means, for comparing said sampled value output by said third means with a threshold value and for adjusting said timing of said clock signal on the basis of a result of comparison.

8. A system as claimed in claim 7, wherein said control means comprises:

means for adjusting said clock signal to advance the sampling point when said sampled value of the impulse response is larger than said threshold value; and means for adjusting said clock signal to delay the sampling point when said sampled value of the impulse response is smaller than said threshold value.

9. A signal reproduction system coupled to a transmission line, said system comprising:

waveform equalizing means for equalizing a digital input signal transmitted via the transmission line using an adjustable gain and for generating an equalized input signal;

decision means, operatively coupled to said waveform equalizing means, for performing a decision procedure for the equalized input signal at a timing and for generating a reproduced digital signal; and gain control means, operatively coupled to said waveform equalizing means and said decision means, for controlling the gain of said waveform equalizing means, said gain control means comprising:

first means, operatively coupled to said decision means, for generating first absolute values of samples of decided values obtained from the reproduced digital signal output by the decision means;

second means, operatively coupled to said decision means, for generating second absolute values of samples of equalized outputs obtained from the equalized input signal input to the decision means;

third means, operatively coupled to said first and second means, for generating a dividing ratio using said first absolute values and said second absolute values, and said ratio being an estimate of a sampled value of an impulse response at a sampling point shifted by a predetermined amount; and adjusting control means, operatively coupled to said third means, for comparing said sampled value output by said third means with a threshold value and for adjusting the gain of said waveform equalizing means for equalizing the waveform of said digital input signal on the basis of a result of comparison.

10. A system as claimed in claim 9, wherein said adjusting control means comprises:

means for adjusting the gain of said waveform equalizing means to decrease the gain when said sampled value of the impulse response is larger than said threshold value; and means for adjusting said gain of said waveform equalizing means to increase the gain when said sampled value of the impulse response is smaller than said threshold value.

11. A signal reproduction system coupled to a transmission line, said system comprising:

waveform equalizing means for equalizing a digital input signal transmitted via the transmission line and for generating an equalized input signal;

decision means, operatively coupled to said waveform equalizing means, for performing a decision procedure for the equalized input signal at a timing and for generating a reproduced digital signal; and timing reproduction means, operatively coupled to said waveform equalizing means and said decision means, for generating a clock signal from said equalized input signal and said reproduced digital signal, said clock signal defining said timing of said decision means, said timing reproduction means comprising:

first means, operatively coupled to said decision means, for generating a first sum of absolute values of j (where j is a natural number) samples of decided values obtained from the reproduced digital signal of the decision means;

second means, operatively coupled to said decision means, for generating a second sum of absolute values of j samples of equalized outputs obtained from the equalized input signal of said decision means;

third means, operatively coupled to said first and second means, for generating a ratio of said first sum of said second sum, and said ratio being an estimate of a sampled value of an impulse response at a sampling point; and control means, operatively coupled to said third means, for comparing said sampled value output by said third means with a threshold value and for adjusting the timing of said clock signal on the basis of a result of comparison.

12. A system as claimed in claim 11, wherein said control means comprises:

means for adjusting said clock signal to advance the sampling point when said sampled value of the impulse response is larger than said threshold value; and means for adjusting said clock signal to delay the sampling point when said sampled value of the impulse response is smaller than said threshold value.

13. A signal reproduction system coupled to a transmission line, said system comprising:

waveform equalizing means for equalizing a digital input signal transmitted via the transmission line using an adjustable gain and for generating an equalized input signal;

decision means, operatively coupled to said waveform equalizing means, for performing a decision procedure for the equalized input signal at a timing and for generating a reproduced digital signal; and gain control means, operatively coupled to said waveform equalizing means and said decision means, for controlling the gain of said waveform equalizing means, said gain control means comprising:

first means, operatively coupled to said decision means, for generating a first sum of absolute values of j (where j is a natural number) samples of decided values obtained from the reproduced digital signal of said decision means;

second means, operatively coupled to said decision means, for generating a second sum of absolute values of j samples of equalized outputs obtained from the equalized input signal of said decision means;

third means, operatively coupled to said first and second means, for generating a ratio of said first sum and said second sum, said ratio being an estimate of a sampled value of an impulse response at a sampling point; and adjusting control means, operatively coupled to said third means, for comparing said sampled value output by said third means with a threshold value and for adjusting the gain of said waveform equalizing means for equalizing the waveform of said digital input signal on the basis of a result of comparison.

14. A system as claimed in claim 13, wherein said adjusting control means comprises:

means for adjusting the gain of said waveform equalizing means to decrease the gain when said sampled value of the impulse response is larger than said threshold value; and means for adjusting said gain of said waveform equalizing means to increase the gain when said sampled value of the impulse response is smaller than said threshold value.

* * * * *

UNITED STATES PATENT AND TRADEMARK OFFICE
CERTIFICATE OF CORRECTION

PATENT NO.  :   5,291,522

DATED       :   March 1, 1994

INVENTOR(S) :   Ueno et al.

It is certified that error appears in the above-identified patent and that said Letters Patent is hereby corrected as shown below:

On title page, item [57]

Abstract, line 13, after "parts" insert --,--.

Col. 3, line 48, delete "fn.an-1" and substitute
--$f_n \cdot a_{n-1}$--.

Col. 4, line 29, delete "$a_{n-1}^2$" and substitute
--$a_{n-1} \cdot f_n$-- and delete "$a_{n-1}^2$" and substitute
--$a_{n-1}^2$--; and
line 50, after "with" insert --the--.

UNITED STATES PATENT AND TRADEMARK OFFICE
CERTIFICATE OF CORRECTION

PATENT NO. : 5,291,522
DATED : March 1, 1994
INVENTOR(S) : Ueno et al.

It is certified that error appears in the above-indentified patent and that said Letters Patent is hereby corrected as shown below:

Col. 10, line 18, delete "E|an-1|" and substitute --$E|a_{n-1}|$--.

Signed and Sealed this

Sixth Day of September, 1994

Attest:

BRUCE LEHMAN

*Attesting Officer*     *Commissioner of Patents and Trademarks*